(12) United States Patent
Kaku

(10) Patent No.: US 6,968,119 B1
(45) Date of Patent: Nov. 22, 2005

(54) ELECTRONIC CAMERA WITH COMPRESSION

(75) Inventor: Junya Kaku, Itami (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/417,767

(22) Filed: Oct. 14, 1999

(30) Foreign Application Priority Data

Oct. 19, 1998 (JP) .................................. 10-296998

(51) Int. Cl.[7] .......................... H04N 7/26; H04N 5/225
(52) U.S. Cl. .................. 386/109; 386/33; 348/220.1; 348/394.1
(58) Field of Search ..................... 386/109, 111, 112, 386/18, 20, 33; 348/207.99, 220.1, 394.1, 348/397.1, 239.99, 231.1, 231.7, 231.8, 231.9, 348/231.99

(56) References Cited

U.S. PATENT DOCUMENTS

| | | | | |
|---|---|---|---|---|
| 5,027,214 A | * | 6/1991 | Fujimori | ...................... 386/112 |
| 5,335,016 A | | 8/1994 | Nakagawa | |
| 6,151,069 A | * | 11/2000 | Dunton et al. | ............ 348/220.1 |
| 6,301,392 B1 | * | 10/2001 | Acharya | ................... 348/231.1 |
| 6,407,772 B2 | * | 6/2002 | Mizoguchi | ............... 348/220.1 |
| 6,453,120 B1 | * | 9/2002 | Takahashi et al. | ........... 386/109 |
| 6,487,366 B1 | * | 11/2002 | Morimoto et al. | ........... 386/109 |
| 6,518,999 B1 | * | 2/2003 | Miyamoto | ................ 348/220.1 |

FOREIGN PATENT DOCUMENTS

| | | |
|---|---|---|
| EP | 0 859 511 A1 | 8/1998 |
| JP | 57-61387 | 4/1982 |
| JP | 6-38196 | 2/1994 |
| JP | 8-288860 | 11/1996 |

* cited by examiner

Primary Examiner—James J. Groody
Assistant Examiner—James A. Fletcher
(74) Attorney, Agent, or Firm—Westerman, Hattori, Daniels & Adrian, LLP

(57) ABSTRACT

An electronic camera includes a CCD imager. When a motion image recording mode is selected, the depression of a shutter button creates a plurality of screens of image signals based on camera signals outputted from the CCD imager. A system controller calculates an optimal compression ratio for compressing the image signal to a target size and sets optimal compression ratio to an image compression circuit. The image compression circuit compresses a current image signal obtained following a preceding image signal with this optimal compression ratio. Such compression process creates a plurality of screens of a compressed image signals, whereby a write control circuit records the plurality of screens of the compressed image signals to a memory card.

7 Claims, 10 Drawing Sheets

ELECTRONIC CAMERA WITH COMPRESSION

BACKGROUND OF THE INVENTION

1. Field of the Invention

This invention relates to electronic cameras and, more particularly, to an electronic camera which compresses, frame by frame, image signals of a plurality of frames consecutively obtained in a snapshot or motion image recording mode thereby recording the compressed image signals onto a recording medium.

2. Description of the Prior Art

In the digital camera, when operating the shutter button, a subject image is taken by an image sensor, providing a camera signal. The obtained camera signal is subjected to signal processing, including color separation and YUV conversion. The image signal thus processed is thereafter recorded onto a recording medium through JPEG compression.

In the case that the recording medium is a detachable medium, say a memory card, there is a need to ensure beforehand the number of recordable frames or still pictures. For achieving this, the compression ratio upon JPEG compression must be controlled on each still image to thereby reduce the size of a compressed image down to a predetermined target size or the smaller.

Due to this, in a still image recording mode wherein one frame of still images is recorded in response to shutter button operation, an image signal is compressed with a predetermined compression ratio into a compressed image signal. Based on a size of the compressed image signal and a target size, calculated is an optimal compression ratio in order to compress the same image signal with an optimal compression ratio.

In a snapshot or motion image recording mode, however, the control of a compression ratio in a similar way takes a long time in recording one frame of image signals, hence decreasing the number of shootable/recordable frames per unit time, i.e. the number of frames. This, however, makes it difficult in a motion image recording mode to realize smooth reproduction of motion images. Also, in a snapshot recording mode, the interval of picture taking is increased resulting in an increased possibility of failing to shoot optimal images.

It is noted that, in image compression conforming to a JPEG format, the change of compression ratio is meant to change a Q factor, i.e. to change a quantization table. This technique is a well-known technology having been applied in most of the existing electronic cameras.

SUMMARY OF THE INVENTION

It is therefore an primary object of the present invention to provide an electronic camera which is capable of compressing an image signal down nearly to a target size in a brief time when performing continuous shooting on a subject.

According to the present invention, an electronic camera which records, by separately compressing, a plurality of screens of image signals to a recording medium, comprising: an image sensor for outputting camera signals of a subject at a predetermined time interval; a processor for creating the plurality of image signals from the camera signals outputted from the image sensor; a calculator for calculating an optimal compression ratio for compressing a preceding one of the image signals to a target size; a compressor for compressing a current one of the image signals with the optimal compression ratio; and a recorder for recording to the recording medium the plurality of screens of compressed image signals created by the compressor.

When corresponding camera signals to a subject image are outputted at a predetermined interval from the image sensor, the processor creates a plurality of screens of image signals from the camera signals. Meanwhile, the calculator calculates an optimal compression ratio for compressing a preceding one of the image signals to a desired size. The compressor compresses a current one of the image signals with the optimal compression ratio calculated by the calculator, i.e. optimal compression ratio for a preceding image signal. The plurality of screens of image signals thus created by the compressor are stored to a memory medium by the recorder.

Because the current image signal is compressed according to an optimal compression ratio for the preceding image signal in this manner, it is possible to compress the image signals down to nearly a target size in a brief time when continuously shooting a subject.

In one aspect of the invention, the calculator calculates the optimal compression ratio based on an arbitrary compression ratio, a signal size that the preceding image signal has been compressed with the arbitrary compression ratio, and the target size.

In another aspect of the invention, a selector selects either one of a first recording mode or a second recording mode. Here, the first recording mode is to create within the recording medium a plurality of still image files separately accommodating the plurality of screens of the compressed image signals. The second recording mode is to create within the recording medium one motion image file collectively accommodating the plurality of screens of compressed image signals. The processor creates a first resolution of an image signal when the first recording mode is selected and a second resolution of an image signal when the second recording mode is selected, and the target size being different between the first recording mode and the second recording mode. In this case, the target size used to calculate an optimal compression ratio is different between the first recording mode and the second recording mode.

In one embodiment, the first resolution is higher than the second resolution, and the target size in the first recording mode being greater than the target size in the second recording mode.

In another embodiment, the processor creates one frame of image signal at a first predetermined interval when the first recording mode is selected and one screen of image signal at a second predetermined interval when the second recording mode is selected. Here, the first predetermined interval is longer than the second predetermined interval.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
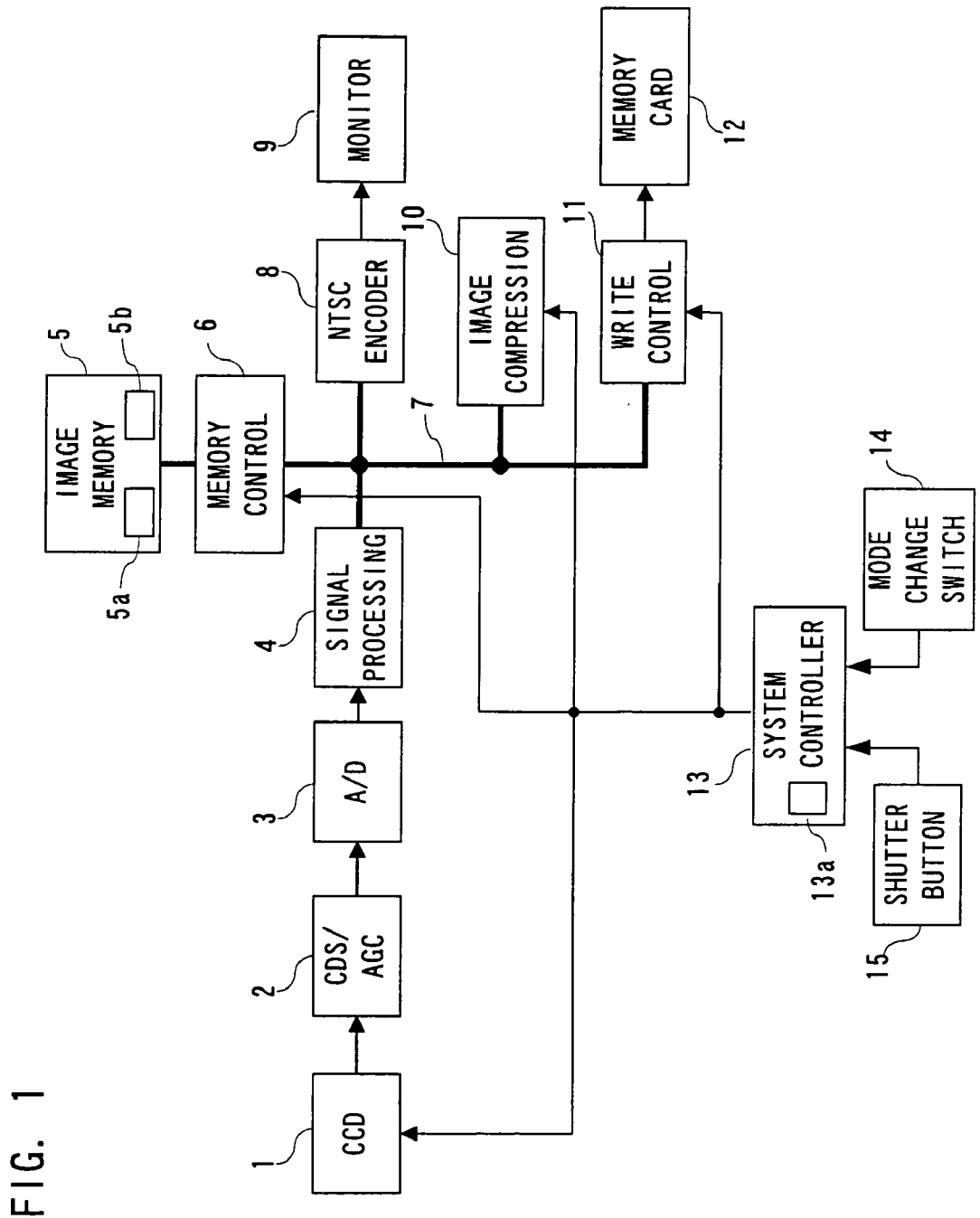
FIG. 1 is a block diagram showing one embodiment of the present invention.

Referring to FIG. 1, an electronic camera of this embodiment includes a CCD imager 1. The CCD imager 1 photo-electrically converts an incident subject image through the lens (not shown) into camera signals and outputs the camera signals with a VGA size (640×480 pixels) every ¹⁄₁₅th of a second. The output camera signal is subjected to well-known noise removal and level adjustment by a CDS/AGC circuit 2, and then converted into camera data as a digital signal by an A/D converter 3. A signal processing circuit 4 in a following stage performs well-known signal processing, e.g. color separation and YUV conversion, on the camera data to thereby create image data comprising luminance data and 2-kinds chrominance data. The created image data is sent through a bus 7 to a memory control circuit 6. The image data is stored into an image data storage area 5a of an image memory 5 by the memory control circuit 6.

Figure 2:
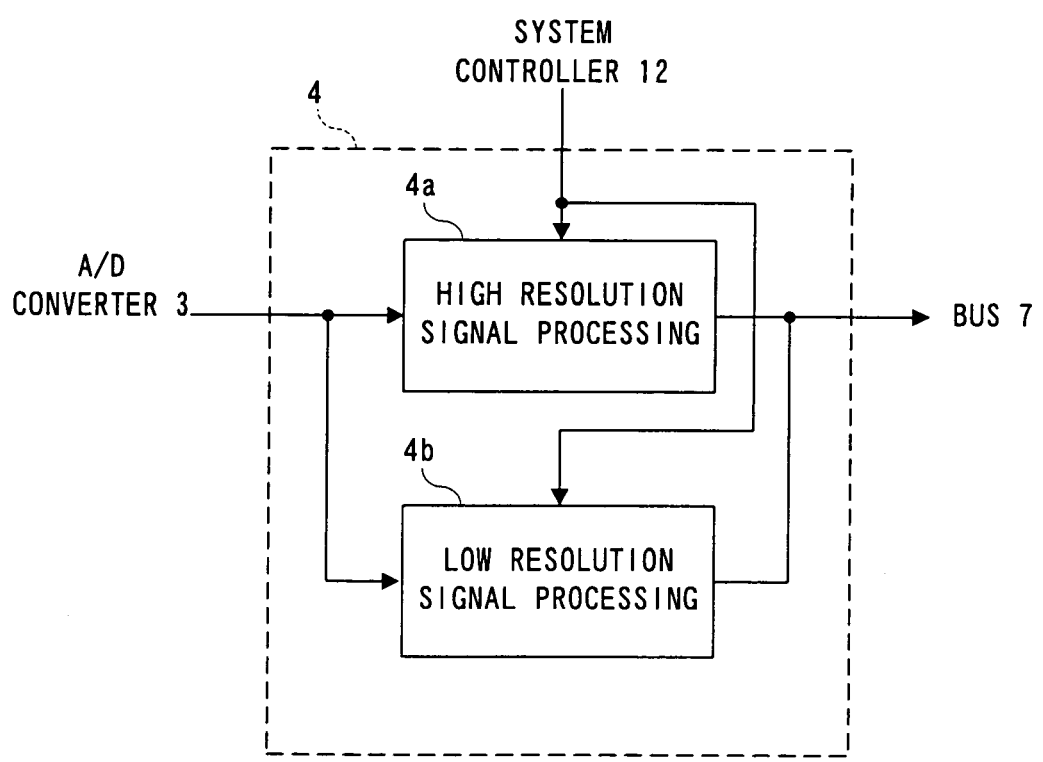
FIG. 2 is a block diagram showing one part of the FIG. 1 embodiment.
Figure 3:
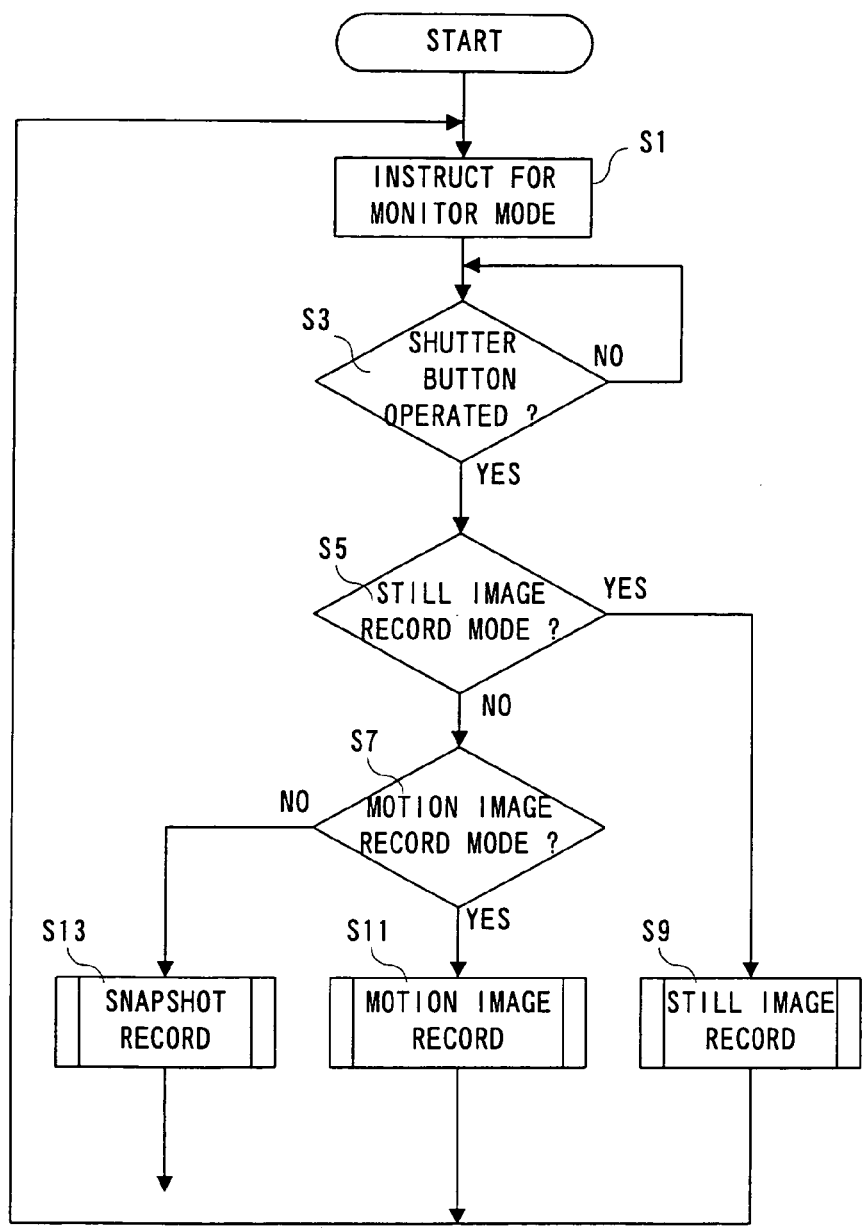
FIG. 3 is a flowchart showing one part of operation in the FIG. 1 embodiment.

Referring to FIG. 2, the signal processing circuit 4 includes a high resolution signal processing circuit 4a and a low resolution signal processing circuit 4b. The high resolution signal processing circuit 4a performs color separation and YUV conversion on the VGA-sized camera data and outputs image data of the same VGA size, i.e. high resolution image data. On the other hand, the low resolution signal processing circuit 4b performs thinning-out on the VGA-sized camera data and then makes color separation and YUV conversion on that data, outputting image data of a QVGA size of (320×240 pixels), i.e. low resolution image data. These high resolution signal processing circuit 4a and low resolution signal processing circuit 4b are selectively enabled by an instruction given from a system controller 13.

The memory control circuit 6 reads out image data stored in the image data storage area 5a in response to a request sent from an NTSC encoder 8, and inputs it to the NTSC encoder 8 through a bus 7. The NTSC encoder 8 encodes the input image data by the use of an NTSC format, and provides an obtained composite video signal to a monitor 9. As a result, subject motion images (through-images) are displayed real time on the monitor 9.

An image compression circuit 10, when receiving a compression command from the system controller 3, sends a request to the memory control circuit 6 to read out the image data stored in the image data storage area 5a. The image compression circuit 10 compresses the image data read out by the memory control circuit 6 with using a JPEG format, according to the compression ratio data received together with a compression command. The image compression circuit 10 also sends a request to the memory control circuit 6 to write the compressed image data so that the memory control circuit 6 stores the compressed image data into the compression data storage area 5b of the image memory 5. Incidentally, when one frame of compressed image data has been stored, the memory control circuit 6 detects a size of the compressed image data and outputs the detected size information together with a compressed data storage completion signal to the system controller 13.

A write control circuit 11 sends a request to the memory control circuit 6 to read out the compressed image data in response to a write command. Due to this, if the compressed image data is read out of the compressed data storage area, the write control circuit 11 creates within a detachable memory card 12 an image file storing this compressed image data. The write control circuit 11, when the write process has been completed, outputs a write completion signal.

A mode change switch 14 is a switch that a user can manually select to any of a still image recording mode, snapshot recording mode and motion image recording mode. The mode selected is inputted as a mode select signal to the system controller 13.

The system controller 13 receives a mode select signal inputted from the mode change switch 14 and enables required circuits for carrying out a process in a desired mode. The system controller 13 also conducts a picture taking process suitable for the mode, responsive to operation of a shutter button 15. Specifically, a flowchart shown in FIG. 3–FIG. 10 is processed. Incidentally, the process of this flowchart is started when a camera power button (not shown) is turned on.

The system controller 13 in step S1 first carries out a monitor mode process. Due to this, a subject is shot by the CCD imager 1 and the corresponding camera data is converted into low resolution image data by the low resolution signal processing circuit 4b. The converted image data is temporarily stored in the image data storage area 5a and thereafter outputted to the NTSC encoder 8. The NTSC encoder 8 creates a composite video signal based on the input image data and outputs a created composite video signal to the monitor 9. As a result, motion images are displayed real time on the monitor 9.

Incidentally, in the monitor mode no compression and write commands are issued from the system controller 13 so that the image compression circuit 10 and the write control circuit 11 will not operate in the monitor mode. Due to this, motion images are merely displayed on the monitor without being recorded onto the memory card 12.

The system controller 13 subsequently determines in step S3 whether the shutter button 15 was operated or not. If "YES", a current recording mode is determined in step S5 and step S7. Specifically, determination is made based on a mode select signal sent from the mode change switch 14 whether selected is a still image recording mode or a continuous image recording mode such as a snapshot or motion image recording mode.

Figure 4:
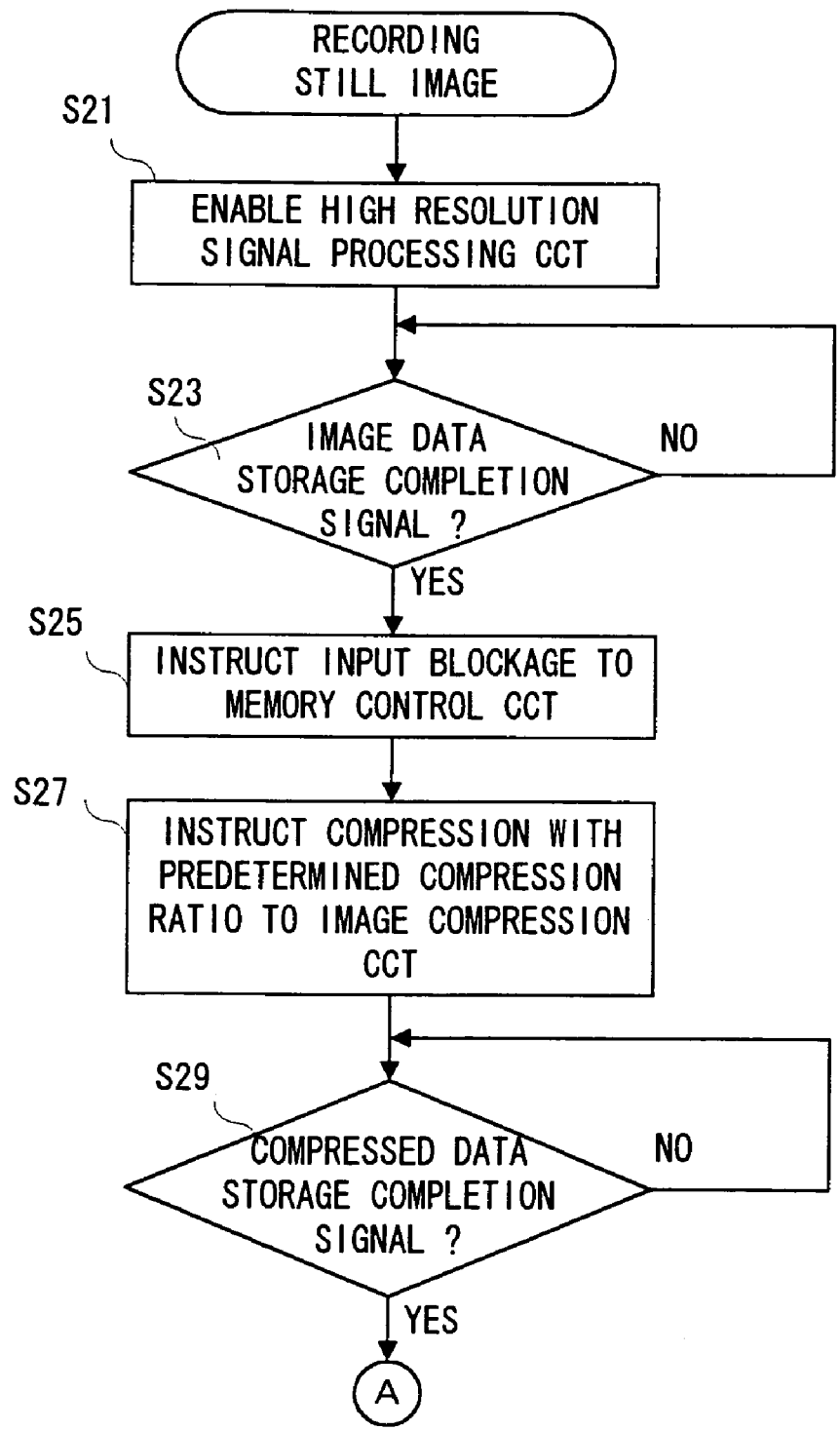
FIG. 4 is a flowchart showing another part of operation in the FIG. 1 embodiment.
Figure 5:
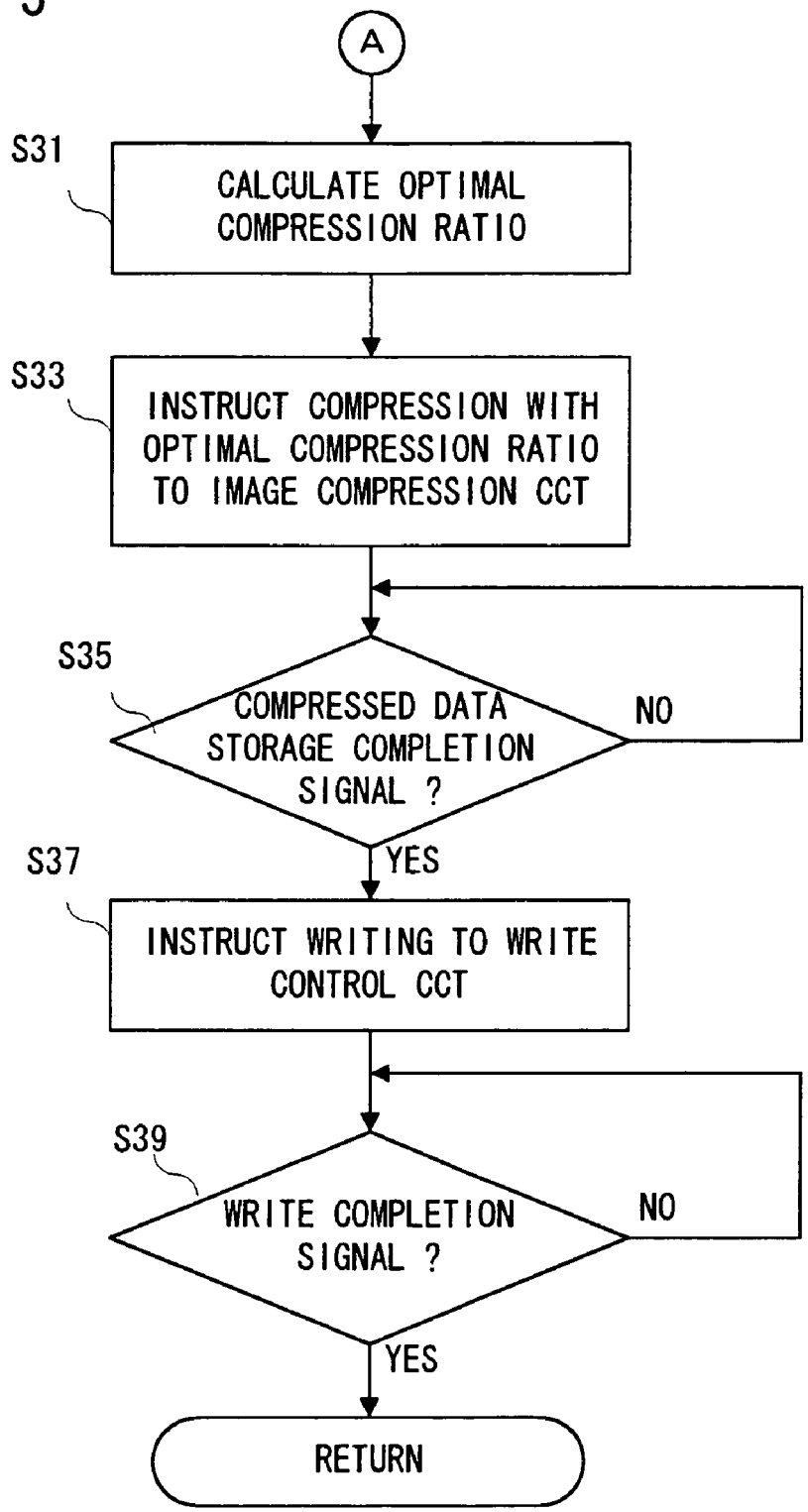
FIG. 5 is a flowchart showing still another part of operation in the FIG. 1 embodiment.

In the case that a still image recording mode is selected, the system controller 13 proceeds from the step S5 to step S9 to execute a still image recording process according to a subroutine shown in FIG. 4 and FIG. 5. Where a motion image recording mode is selected, the control proceeds from the step S7 to step S11 to execute a motion image recording process according to a subroutine shown in FIG. 6 and FIG. 7. Where a snapshot recording mode is selected, the control advances from the step S7 to step S13 to execute a snapshot recording mode according to a subroutine shown in FIG. 8 to FIG. 10. After completing any of the processes of the steps S9–S1, the system controller 13 returns to the step S1.

Referring to FIG. 4 and FIG. 5, in a still image recording mode the high resolution signal processing circuit 4a is first enabled in step S21. Due to this, the camera data of subject shot by the CCD imager 1 is converted into image data without being processed by thinning-out. The converted high resolution image data is stored by the memory control circuit 6 into the image data storage area 5a of the image memory 5. When one-frame image data has been stored after shutter button 15 operation, the memory control circuit 6 outputs an image data storage completion signal to the system controller 13. Inputted by an image data storage completion signal, the system controller 13 in step S23 determines "YES" and proceeds to step S25. In this step, the memory control circuit 6 is instructed to block input of image data newly created by the signal processing circuit 4. As a result, the image data storage area 5a keeps holding same image data.

In step S27 the image compression circuit 10 is instructed to effect compression with a predetermined compression ratio. Responsive to this compression command, the image compression circuit 10 fetches the image data stored in the image data storage area 5a and compresses the image data with a predetermined compression ratio. The image compression circuit 10 also stores the compressed image data into the compression data storage area 5b. After the compressed image data has been stored, the memory control circuit 6 outputs size information of this compressed image data and a compressed data storage completion signal to the system controller 13.

Given a compressed image data storage completion signal, the system controller 13 determines "YES" in step S29. In step S31 an optimal compression ratio is calculated according to Equation 1.

Optimal Compression Ratio=(Compressed Image Data Size/Target Size) ×Predetermined Compression Ratio. [Equation 1]

That is, the size information on the compressed image data given from the memory control circuit 6 is divided by a target size, and a resulting divided value is multiplied by the predetermined compression ratio used in the step S27. This provides calculation of a compression ratio that can reduce the compressed data size down to a target size, i.e. an optimal compression ratio.

After determining an optimal compression ratio as above, the system controller 13 advances to step S33 where it instruct the image compression circuit 10 to conduct compression with the optimal compression ratio. The image compression circuit 10, in turn, fetches compressed data from the image data storage data 5a similarly to the above, and performs compression on this image data with the optimal compression ratio. Furthermore, the created compressed image data is written to the compression data storage area 5b. When completing the writing, the memory control circuit 6 outputs a compressed data storage signal and compressed image data size information (target size information) to the system controller 13.

When a compressed data storage signal is outputted, the system controller 13 in step S35 determines "YES" and in the following step S37 instructs the write control circuit 37 to write the compressed image data. In response to the write instruction, the write control circuit 11 fetches the compressed image data out of the compressed data storage area 5b and creates within the memory card 12 a still image file storing this compressed image data. When the writing is completed, the write control circuit 11 outputs a write completion signal to the system controller 13.

The system controller 13, when receiving a write completion signal from the write control circuit 11, determines "YES" in step 39, then returning to the main routine, i.e. returns to the step S1.

In the step S1 a monitor mode process is executed. Accordingly, in the signal processing circuit 4 the low resolution signal processing circuit 4b is again enabled. Meanwhile, the memory control circuit 6 stores the image data outputted from the signal processing circuit 4 into the image data storage area 5a. The NTSC encoder 8 creates a composite video signal based on the image data stored in the image data storage area 5a. On the other hand, the image compression circuit 10 and write control circuit 11 are disabled. As a result, subject motion images are displayed on the monitor 9.

Incidentally, in a still image recording mode the image data within the image data storage area 5a is suspended from being updated. Accordingly, on the monitor is displayed an image (freeze image) corresponding to the image data stored within the image data storage area 5a.

Figure 6:
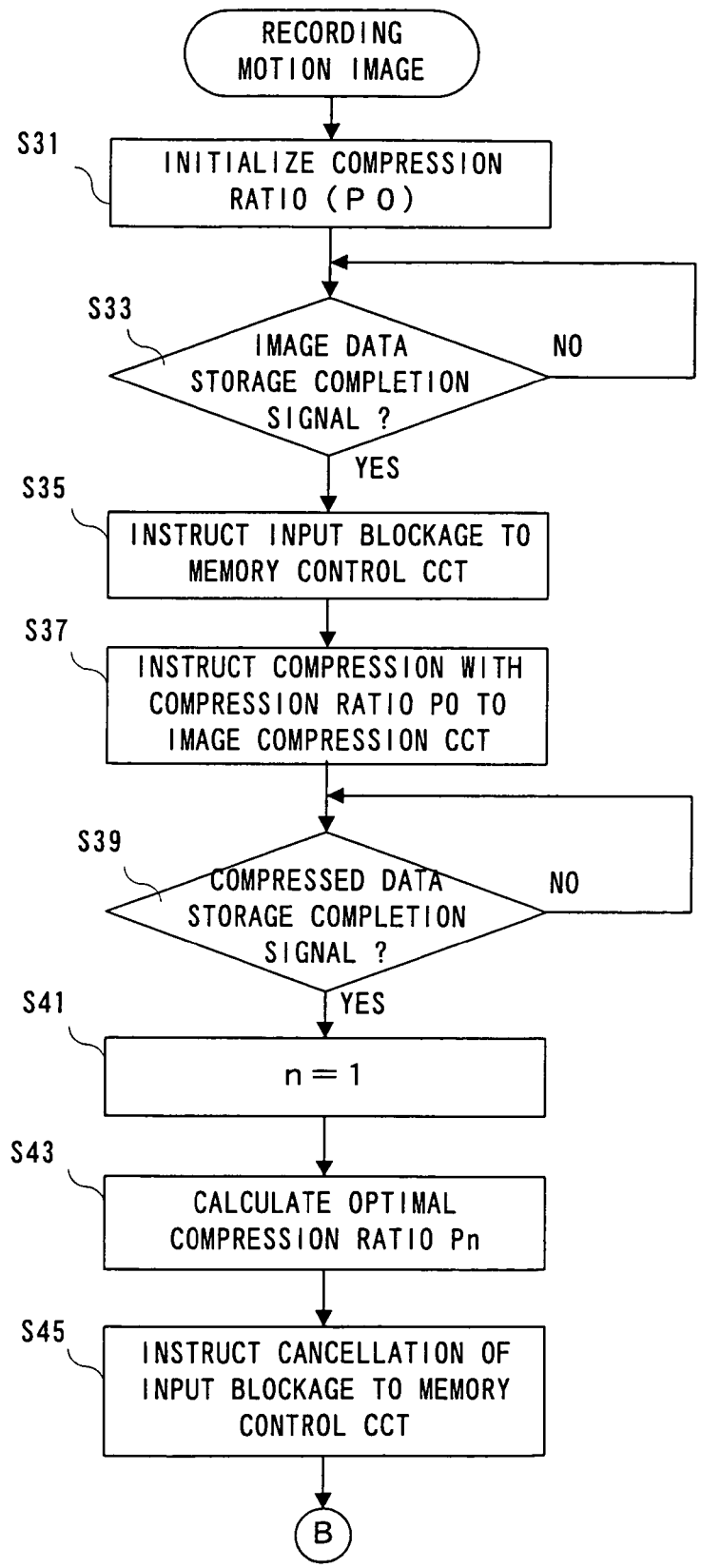
FIG. 6 is a flowchart showing further part of operation in the FIG. 1 embodiment.
Figure 7:
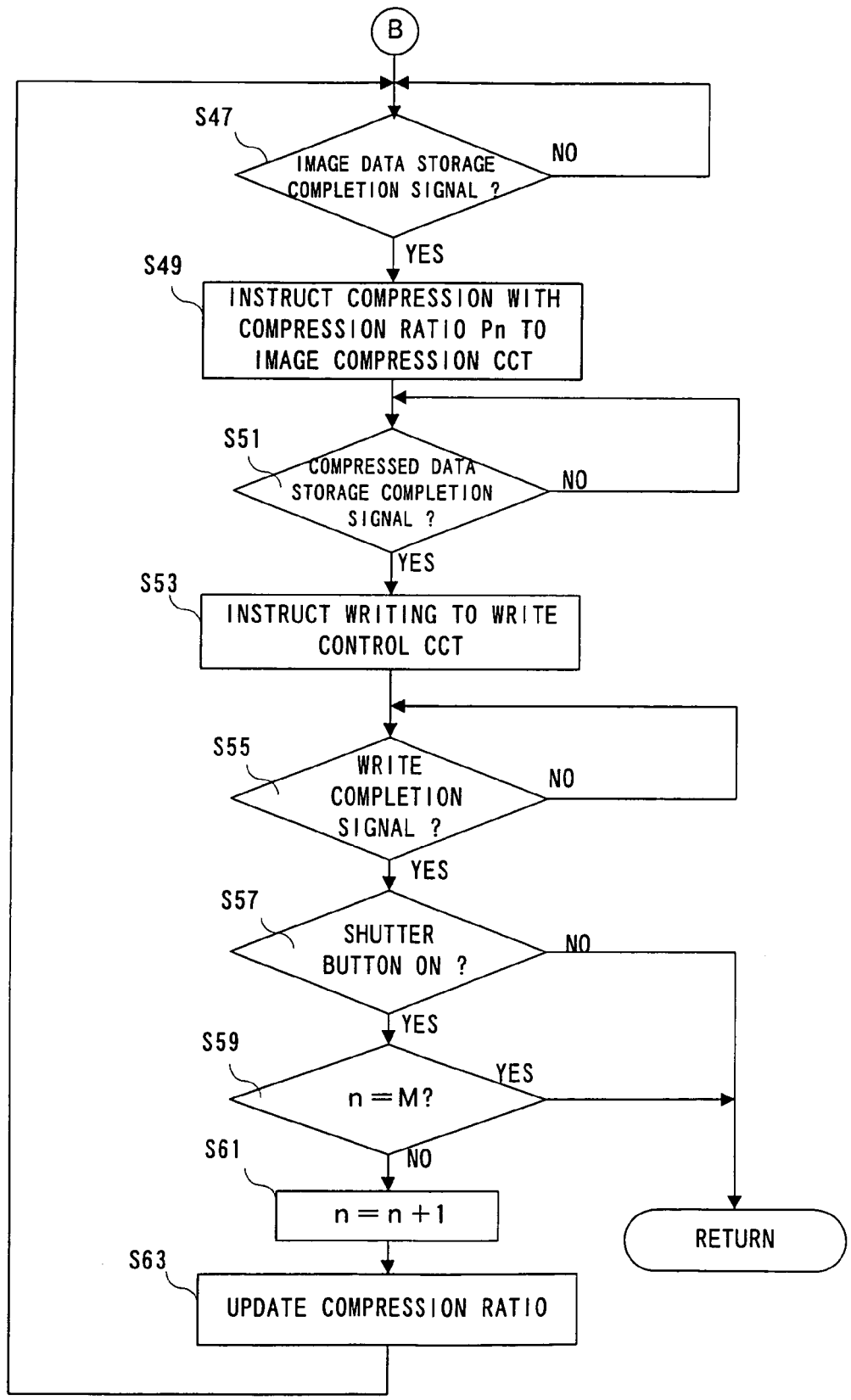
FIG. 7 is a flowchart showing another part of operation in the FIG. 1 embodiment.

Referring to FIG. 6 and FIG. 7, in a motion image recording mode the compression ratio is first initialized in step S31. That is, an initial compression ratio P0 is set. The system controller 13 in step S33 determines whether an image data storage completion signal has been inputted from the memory control circuit 6 or not. When determined "YES", in step S35 an input blockage command is issued to the memory control circuit 6. Due to this, the image data in a first frame after operating the shutter button 15 is kept held within the image data storage area 5a.

Incidentally, in a motion image recording mode the low resolution signal processing circuit 4b having been enabled in the monitor mode is used continuously. The image data storage area is written by image data with a low resolution (OVGA size).

The system controller 13 in step S37 subsequently instructs the image compression circuit 10 to perform compression with the compression ratio P0. In response to this compression command, the image compression circuit 10 fetches image data out of the image data storage area 5a and performs JPEG compression on this image data with compression ratio P0. The image compression circuit 10 also writes the created compressed image data to the compressed data storage area 5b. Incidentally, the reading of the image data out of the image data storage area 5a and the writing of the compressed image data to the compressed data storage area 5b are carried out by the memory control circuit 6, as stated above. Meanwhile, when the compressed image data has been written, the memory control circuit 6 detects a size S0 of this compressed image data and outputs size information together with a compressed data storage completion signal to the system controller 13.

When a compressed data storage completion signal is outputted, the system controller 13 in step S39 determines "YES". Then, in step S41 a count value n of the counter 13a is set to "1", and in step S43 a compression ratio P1 (1; count value) is calculated according to Equation 2.

Compression Ratio P1=(Compressed Image Data Size S0/Target Size) ×Initial Compression Ratio P0 [Equation 2]

After an optimal compression ratio has been determined, the system controller 13 in step S45 instructs the memory control circuit 6 to cancel the input blockage. This recording mode is required to record motion images. Accordingly, cancellation of the input blockage is instructed in order to write the image data in each frame onto the image data storage area 5a Hereinafter no input blockage will be issued to the memory control circuit 6.

Incidentally, actually recorded to the memory card 12 is the image data obtained after issuing such an input blockage canceling command.

If the image data in the first frame after canceling the input blockage is stored in the image data storage area, the memory control circuit 6 outputs an image data storage completion signal. Thereupon, the system controller 13 in step S47 determines "YES" and in step S49 instructs the image compression circuit 10 to perform compression with a compression ratio Pn (first frame; n=1). The image compression circuit 10 fetches image data from the image data storage area 5a and performs JPEG compression on it with a compression ratio P0. Then, the created compressed image data is written to the compressed data storage area 5b. When the compressed image data has been written, the memory control circuit 6 detects a size Sn of this compressed image data and outputs size information together with a compressed data storage completion signal to the system controller 13.

Given a compressed data storage completion signal, the system controller 13 in step S51 determines "YES" and issues a write command to the write control circuit 11. The write control circuit 11 creates a motion image file within the memory card 12 in response to this write command, and accommodates compressed image data of the created motion image file. At this time, the count value n of the counter 13a, i.e. image no., is also recorded related to the compressed image data. When the write operation like this has been completed, the write control circuit 11 outputs a write completion signal to the system controller 13.

It is noted that such motion image file is created by the write control circuit 11 only when a first write command is outputted. When given a second or later write command, compressed image data will be accommodated in an already-prepared motion image file. Due to this, obtained within a same motion image file is a plurality of frames of compressed image data related to image nos.

When a write completion signal is outputted, the system controller 13 advances from step S55 to step S57 to determine whether the shutter button 15 is still on or not. If the shutter button 15 is on, then in step S59 the count value n is compared with the number of maximum recordable frames M. If n<M, the control proceeds to step S61. Incidentally, if the shutter button 15 is off or on with n=M, the control returns to the main routine. As a result, the motion image recording mode is ended.

In step S61 the counter 13a is incremented, and in the following step S63 a compression ratio Pn is determined according to Equation 3. After determining a next compression ratio in this manner, the system controller 13 returns to the step S47 to execute again the process similar to the above.

Compression Ratio Pn=(Compressed Data Size Sn-1/
Target Size) ×Compression Ratio Pn-1    [Equation 3]

The compression ratio determined by Equation 2 or 3 is one that can compress the image data in a previous frame into a target size. That is, Equation 2 can calculate a compression ratio P1 at which the image data of 0th frame can be reduced to a target size. With this compression ratio P1 the image data in the first frame is compressed. Meanwhile, Equation 3 can determine a compression ratio Pn with which the image data in a (n-1)th-frame can be reduced down to a target size. With this compression ratio Pn the image data in an n-th frame is compressed. Accordingly, even if the image data in a current frame be compressed with this compression ratio, the resulting compressed image data is not necessarily put within a target size.

However, camera signals are outputted from the CCD imager 1 at an interval of $\frac{1}{15}$th of a second. Accordingly, if panning or tilting is conducted within a duration of approximately $\frac{1}{15}$th of a second, no significant difference occurs between the object image in the preceding frame and the subject image in the current frame. Consequently, the current frame image data is compressed with an optimal compression ratio or the preceding frame image data, the current frame image data can be put nearly within a target size.

Figure 8:
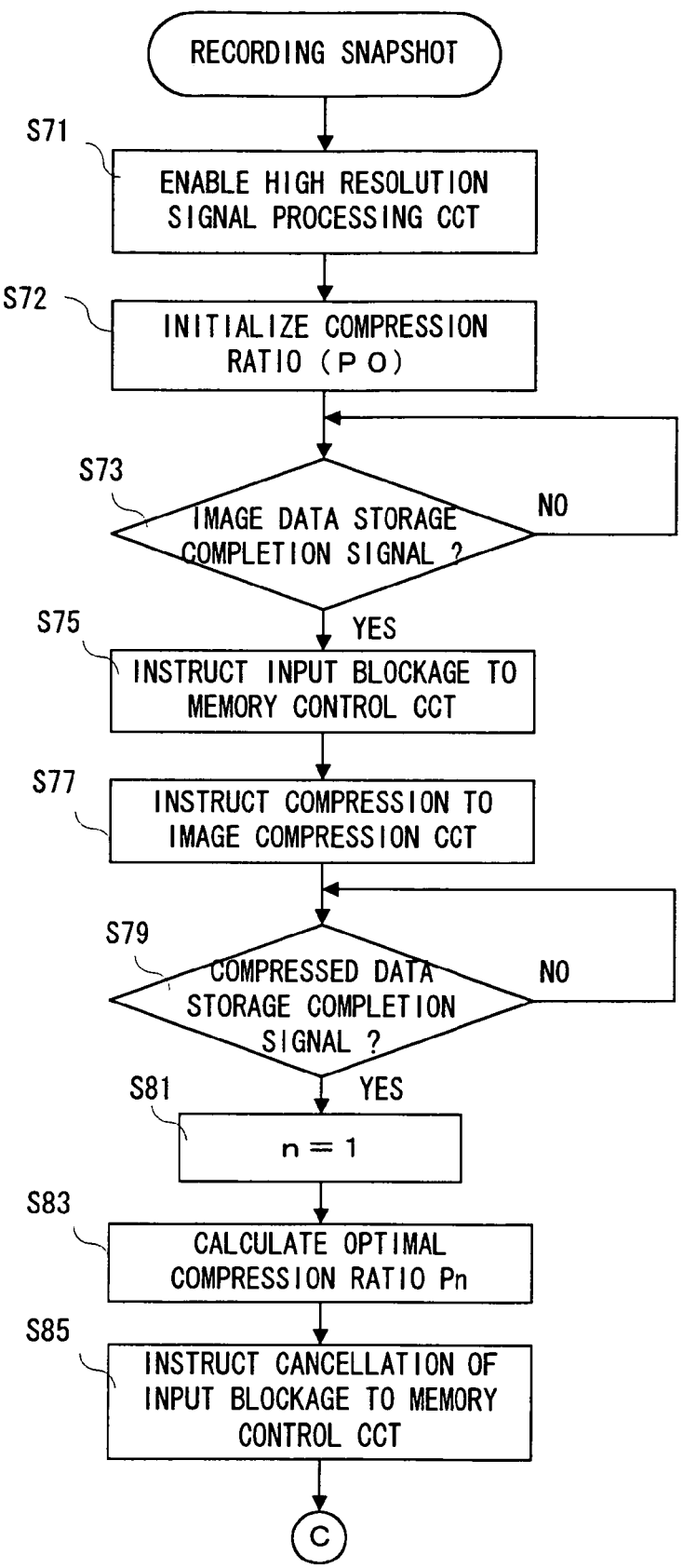
FIG. 8 is a flowchart showing still another part of operation in the FIG. 1 embodiment.
Figure 9:
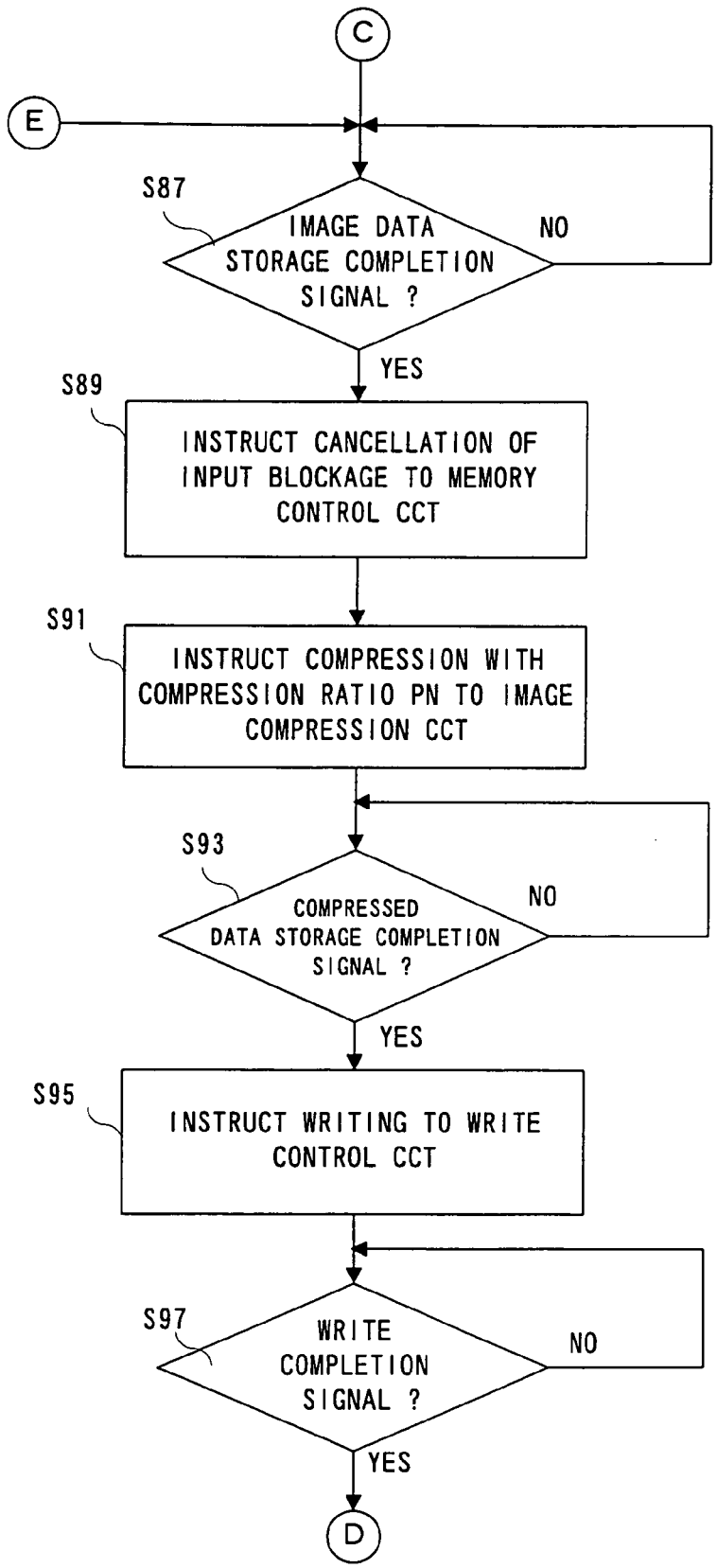
FIG. 9 is a flowchart showing further part of operation in the FIG. 1 embodiment.
Figure 10:
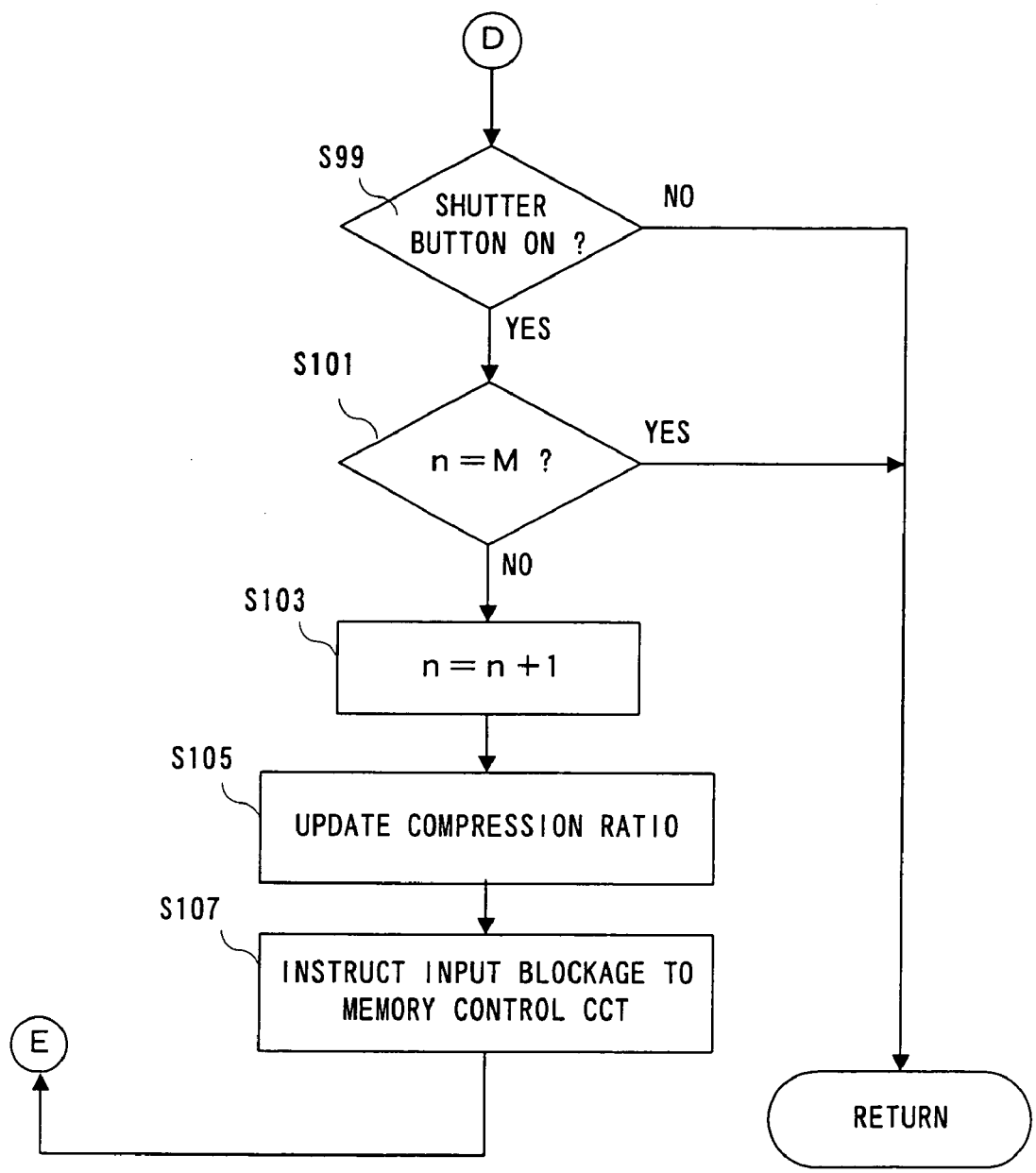
FIG. 10 is a flowchart showing another part of operation in the FIG. 1 embodiment.

Referring to FIG. 8 to FIG. 10, the snapshot recording process is similar to the motion image recording process shown in FIG. 6 and FIG. 7 except in that in step S71 the high resolution signal processing circuit 4a is enabled, in step S89 the memory control circuit 6 is instructed to cancel input blockage, in step S107 the memory control circuit 6 is instructed to block against input, in steps S83 and S105 a target size used in compression ratio calculation is greater than a target size used upon motion image recording, and the write control circuit 11 creates one still image file accommodating one-frame compressed image data responsive to a write command. Accordingly, duplicated explanations will be omitted on the similar points.

In step S71 the high resolution signal processing circuit 4a is enabled, and in step S95 one still image file is created in the memory card 12 each time a write command is issued. Accordingly, in the snapshot recording mode the image data of VGA is recorded frame by frame onto the memory card 12. Also, in the snapshot recording mode, in order to record image data at an interval of several frames, in step S107 an input blocking command is given to the memory control circuit 6 and in step S89 an output blockage canceling command is supplied to the same memory control circuit 6.

According to present embodiment, when a still image recording mode is selected, the image data is compressed with a predetermined compression ratio thus providing compressed image data. Based on a size of compressed image data and the above predetermined compression ratio and a target size, an optimal compression ratio is calculated that can reduce the image data down to a target size. Thereafter, the same image data is again compressed with the optimal compression ratio whereby the obtained compressed image data is recorded to the memory card.

When a motion image or snapshot recording mode is selected, there is not sufficient time for performing compression twice as conducted in the still image recording mode. Consequently, calculated is an optimal compression ratio for the image data created in the preceding frame so that the image data created in the present time is compressed with this optimal compression ratio for the preceding time. Because no significant difference occurs between the subject images in succeeding several frames, the image data compressed with the optimal compression ratio for the preceding time has a size approximate to a target size. Moreover, because compression may be satisfactorily made once per frame, there is less possibility that a breakdown occurs recording the image data.

If as well known the image file recorded on the memory card 12 is transferred to a personal computer and the compressed image data thereof is decompressed by the use of predetermined application software, then the shot image is reproduced on the display. As for a motion image file, it is possible to display motion images on the display by reproducing compressed image data at a predetermined time interval according to image nos. assigned to the header.

Incidentally, it is needless to say that still or motion images can be reproduced on the monitor 9 if such image decompression function is provided in the camera main body.

Meanwhile, if in the FIG. 1 block diagram the image memory 5 is configured by an SDRAM, the data transfer through the bus 7 is usually affected by DMA. Furthermore, although it was explained that image display on the monitor 9 be necessarily made simultaneous with turning on the power to the camera, a monitor ON/OFF switch may be provided for allowing choice by an operator. Furthermore, a character representative of not recordable may be displayed not only on the monitor 9 but also on a remaining power indicator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imaging device for outputting a previous image signal and a current image signal of an object;
   a processor for subjecting the image signals, outputted from said imaging device, to a signal processing;
   a calculator for calculating a specific compression ratio for the current image signal based on a compression ratio that compresses the previous image signal to a target size;
   a compressor for compressing the current image signal using the specific compression ratio calculated by said calculator;
   a recorder for recording to a recording medium compressed image signals created by said compressor.

2. An electronic camera according to claim 1, wherein said calculator calculates the specific compression ratio based on an initial compression ratio, a compressed size of the previous image signal and the target size.

3. An electronic camera according to claim 1, further comprising a selector for selecting one of a first recording mode to create % within said recording medium a plurality of still image files respectively accommodating the compressed image signals and a second recording mode to create within said recording medium a motion image file collectively accommodating compressed image signals, wherein said processor creates the image signal having a first resolution when the first recording mode is selected by said selector and creates the image signal having a second resolution when the second recording mode is selected by said selector, and the specific size is different between the first recording mode and the second recording mode.

4. An electronic camera according to claim 3, wherein the first resolution is higher than the second resolution, and the target size directed to the first recording mode is greater than the target size directed to the second recording mode.

5. An electronic camera according to claim 3, wherein said imaging device outputs one screen of the image signal at a first interval when the first recording mode is selected and outputs one screen of the image signal at a second interval when the second recording mode is selected.

6. An electronic camera according to claim 5, wherein the first interval is longer than the second interval.

7. An electronic camera according to claim 1, wherein the previous image signal is an image signal previous to the current image signal by a number of screens corresponding to a calculation period of said calculator.

* * * * *